June 1, 1926.
T. E. MURRAY, JR
1,586,690
WELDING ARTICLES OF VARYING THICKNESS
Filed Feb. 1, 1923
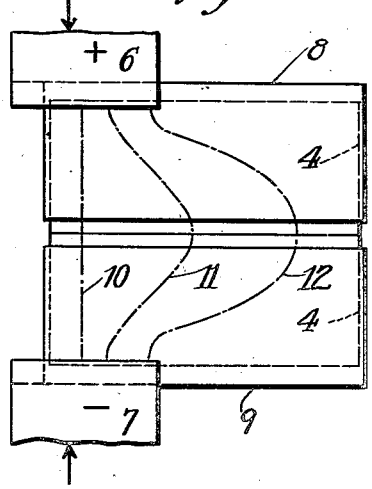
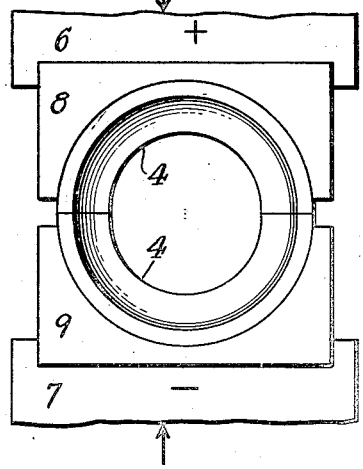
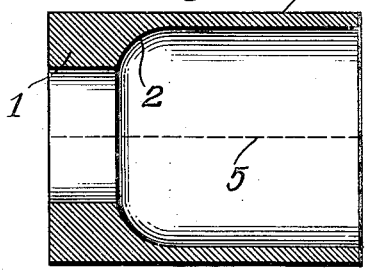
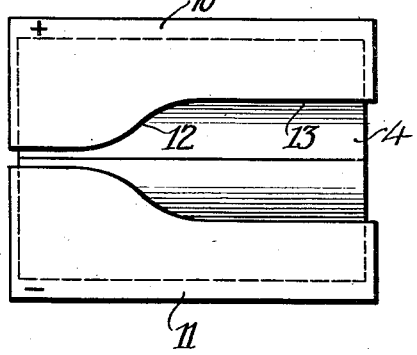
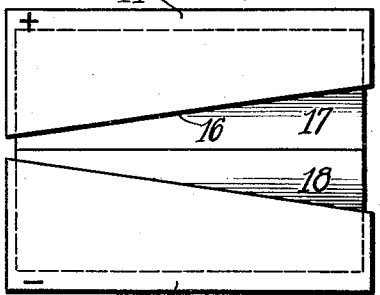
INVENTOR
Thomas E. Murray, Jr.
BY
ATTORNEY

UNITED STATES PATENT OFFICE.

THOMAS E. MURRAY, JR., OF BROOKLYN, NEW YORK.

WELDING ARTICLES OF VARYING THICKNESS.

Application filed February 1, 1923. Serial No. 616,225.

In welding together parts which are of varying thickness at the joint it is difficult to secure a uniform effect. My invention aims to secure such a result, particularly in the electric butt welding of tubular segments which are thicker at one point of their length than at another.

The accompanying drawings illustrate an embodiment of the invention.

Fig. 1 is a side elevation of the parts in position for the welding operation;

Fig. 2 is an end view of the same;

Fig. 3 is a vertical diametral section of the product;

Figs. 4 and 5 are side elevations of modified electrodes.

In the case illustrated I desire to make a tube as shown in Fig. 3 which has a thicker wall 1 at one end connected by a tapered portion 2 with a thin wall 3 constituting the other end.

Two semi-circular segments 4 are formed with the required variation in thickness, by forging or other suitable methods according to the desired shape. These are placed edge to edge and welded along their contacting edges to form joints indicated by the dotted line 5, Fig. 3. The finished product may be truly circular in cross-section. The segments 4, however, are provided with a small extra width of metal at the edges to be taken up in the welding operation.

Various methods of electric welding may be used as the basis of the present invention. I prefer the method described in my Reissue Patent No. 15,466 of October 10, 1922, which consists in passing a current of extremely high amper strength for a very brief regulated period of time while applying pressure to the joint.

With parts of varying thickness, as illustrated, it is difficult to secure a uniform condition along the length of the joint. If no precautions were taken to avoid it, the thinner part would be heated and welded before the thicker part. If the time limit were set for the thinner part, then the weld would be incomplete at the thicker part. If the time limit were extended so as to secure the best results at the thicker part, the metal would be greatly softened and burned to some extent at the thinner part. To avoid these disadvantages I propose to pass the current by paths of different lengths or different resistances at different points along the joint so as to effect the welding operation more slowly at one point than at another. In the particular case illustrated the welding current will be passed by the shorter path or the lesser resistance through the thicker part of the joint.

Various means may be utilized for effecting this process. In the case illustrated in Figs. 1 and 2 I interpose between two main electrodes 6 and 7 and the respective parts of the work, supplementary electrodes or conductors 8 and 9. The supplementary electrodes cover substantially the full length of the work. The main electrodes overlie only the thicker part of the work, so that the work and the supplementary electrodes extend laterally beyond the main electrodes. The parts 6 and 8 may be considered as one electrode shaped so as to carry the current to the work through paths of different lengths, and may in effect be made in one piece; and the same is true of the two parts 7 and 9. It is an advantage, however, to use a separate supplementary electrode, the main electrodes being adapted in this way for a variety of work.

The current passes by paths indicated approximately by the broken and dotted lines 10, 11 and 12; that is to say, by paths which are considerably longer through the thinner parts of the joint than through the thicker parts. Consequently the heating effect of the current commences more quickly at the thicker point, where it is more needed. Also there is less resistance to the passage of the current at this point and, therefore, a more efficient application of it. The variation at different points can be so controlled as to secure a good and approximately uniform weld along the length of the joint.

The arrangement described has also the advantage of bringing a greater pressure to bear at the thicker part of the joint, since such thicker part is directly in line with the electrodes 6 and 7 through which the pressure is applied. This differentiation in pressure helps to secure a uniformly good weld.

Welding machines of various types may be used for carrying the electrodes and for pressing them together as indicated by the arrows, during the welding operation.

According to Fig. 4, the electrodes 10 and 11 are arranged to embrace the work in a manner similar to that of the supplementary electrodes 8 and 9 in Fig. 2, but are made of varying width so as to supply the current at varying rates to the edges of the work. For Fig. 4 the shape of the parts to be welded is assumed to be the same as in Fig. 3. The electrodes correspondingly have their left hand ends of uniform width for a short distance and then have their edges rounded off as at 12 so as to retreat from the edges of the work, the curve 12 merging into a straight portion 13 in a manner similar in a general way to the shape of the joint edge of the work.

Fig. 5 shows electrodes 14 and 15 which have their advanced edges on a straight taper 16. This is for work-pieces 17 and 18, the contacting edges of which vary in thickness in a straight line from end to end.

The described methods of controlling the weld by varying the rapidity or the degree of perfection at different parts of the joint may be applied not only to the cases illustrated, where the work-pieces vary in thickness, but also to other cases where it is desired to perform a more effective or a more reliable welding operation at one part of the joint than at another.

Though I have described with great particularity of detail a certain embodiment of my invention yet it is not to be understood therefrom that the invention is restricted to the particular process and apparatus illustrated. Various modifications may be made by those skilled in the art without departure from the invention as defined in the following claims.

What I claim is—

1. In electric butt welding, the method which consists in passing a welding current by paths of different lengths at different parts of the length of the joint.

2. In electric butt welding, the method which consists in passing a welding current through resistance which differs at different parts of the length of the joint.

3. In electric butt welding, the method which consists in passing a welding current through the joint and pressing the pieces together during the welding operation with a greater pressure at one part of the length of the joint than at another.

4. The method of electrically welding pieces which are of varying thickness at the joint which consists in passing a welding current through the joint and pressing the pieces together during the welding operation with a greater pressure at the thicker parts than at the thinner parts.

5. The method of electrically welding parts which are of varying thickness at the joint which consists in passing the welding current by paths of different lengths at different points along the joint.

6. The method of electrically welding parts which are of varying thickness at the joint which consists in passing the welding current to the parts through resistance which differs at different points along the length in accordance with said differences of thickness of the parts.

7. The method of electrically welding parts which are thicker at one point than at another which consists in passing the welding current by shorter paths through the thicker point.

8. The method of electrically welding parts which are of varying thickness at the joint which consists in passing the welding current to the work by paths of lesser resistance at the thicker points.

9. The method of electric welding which consists in interposing between the main electrode and the work a supplementary electrode or conductor extending laterally beyond the main electrode, said lateral extension engaging the work so as to distribute the current thereto.

10. The method of electrically welding parts which are thicker at one point than at another which consists in carrying the thicker part of the work in a substantially straight path between two electrodes with the thinner part of the work extending laterally from said path.

11. The method of electrically welding parts which are thicker at one point than at another which consists in carrying the thicker part of the work in a substantially straight path between two electrodes with the thinner part of the work extending laterally from said path and with supplementary electrodes interposed between the main electrodes and the work and extending laterally beyond the main electrodes and engaging the laterally extending part of the work.

12. The method of claim 5 applied to the forming of tubular structures by welding together segments of varying thickness along their length.

13. The method of claim 5 applied to the butt-welding of the edges of parts of varying thickness by passing through the joint a current of extremely high amperage or density for a very brief interval of time, while pressing said edges together.

14. The method of claim 6 applied to the forming of tubular structures by welding together segments of varying thickness along their length.

15. The method of claim 6 applied to the butt-welding of the edges of parts of varying thickness by passing through the joint a current of extremely high amperage or density for a very brief interval of time, while pressing said edges together.

16. An apparatus for welding, including in combination a pair of main electrodes adapted to overlie a part of the joint and supplementary electrodes adapted to overlie substantially the entire length of the joint and to be interposed between the main electrodes and the work.

In witness whereof, I have hereunto signed my name.

THOMAS E. MURRAY, Jr.